(12) United States Patent
Tomaru et al.

(10) Patent No.: US 6,560,267 B1
(45) Date of Patent: May 6, 2003

(54) SOLID-STATE LASER AND OPTICAL TRANSMITTER

(75) Inventors: Tatsuya Tomaru, Hatoyama (JP); Hrvoje Petek, Berlin (DE)

(73) Assignee: Hitachi, Ltd., Tokyo (JP)

( * ) Notice: Subject to any disclaimer, the term of this patent is extended or adjusted under 35 U.S.C. 154(b) by 182 days.

(21) Appl. No.: 09/665,619

(22) Filed: Sep. 19, 2000

(30) Foreign Application Priority Data

Apr. 5, 2000 (JP) ........................................ 2000-107973

(51) Int. Cl.$^7$ ................................................. H01S 3/08
(52) U.S. Cl. ............................ 372/98; 372/99; 372/100
(58) Field of Search ............................. 372/68, 98, 99, 372/101, 108, 100; 359/339, 337.5, 180

(56) References Cited

U.S. PATENT DOCUMENTS

| 5,212,698 | A | * | 5/1993 | Kafka et al. ................... 372/18 |
| 5,553,093 | A | * | 9/1996 | Ramaswamy et al. ....... 372/100 |
| 5,761,227 | A | * | 6/1998 | Hargis et al. .................. 372/22 |
| 5,761,236 | A | * | 6/1998 | Kleinschmidt et al. ...... 372/100 |
| 5,856,996 | A | * | 1/1999 | Durkin et al. ................. 372/98 |
| 6,055,261 | A | * | 4/2000 | Reed et al. .................... 372/93 |
| 6,229,835 | B1 | * | 5/2001 | Tomaru et al. ................ 372/45 |
| 6,393,035 | B1 | * | 5/2002 | Weingarten et al. .......... 372/18 |
| 6,393,037 | B1 | * | 5/2002 | Basting et al. ................ 372/20 |

OTHER PUBLICATIONS

Tomaru et al., Opt. Lett. vol. 25, No. 8, pp. 584–586.
N.Matuschek et al., IEEE Journal of Quantum Electronics, vol. 35, No. 2, pp. 129–137 (1999).
U.Keller et al., IEEE Journal of Selected Topics in Quantum Electronics, vol. 2, No. 3, pp. 435–453 (1996).
A.Kaneko, et al., IEEE Journal of Selected Topics in Quantum Electronics, vol. 5, No. 5, pp. 1227–1236 (1999).
J.Azaa et al., Optics Letters, vol. 24, No. 23, pp. 1672–1674 (1999).
U.S. Ser. No. 09/205,614 corresponding to JP-A-11-168252.
Stark et al.,IEEE Photonics Technology Letters,vol. 9,No. 8, Aug. 1997,pp. 1170–1172.

* cited by examiner

Primary Examiner—Paul Ip
Assistant Examiner—Davienne Monbleau
(74) Attorney, Agent, or Firm—Antonelli, Terry, Stout & Kraus, LLP (57) ABSTRACT

In the wavelength-division-multiplexed optical transmission, laser diodes of the number of multiplicity are disposed as a light source to configure a transmitter. However, since this method requires a large number of light sources and highly precise wavelength control, a cost and an apparatus are increased. An ultrashort pulse solid-state laser is used as the light source of the transmitter and its wide spectrum is taken out by a splitter to be assigned to each channel, so that the number of light sources can be reduced greatly. The transmitter requires high repetition rate such as 2.4 GHz, 10 HGz and the like as the repetition rate of the ultrashort pulse solid-state laser, while by configuring the resonator only by two components as shown in FIG. 1, the high repetition rate can be attained. Since each channel is produced passively from the splitter, very precise wavelength management is not required. The light source is made small and the number thereof is reduced. Consequently, the whole apparatus is made small and a cost thereof is also reduced.

18 Claims, 7 Drawing Sheets

SOLID-STATE LASER AND OPTICAL TRANSMITTER

BACKGROUND OF THE INVENTION

The present invention relates to a small solid-state laser and an optical transmitter using the solid-state laser.

The number of optical multiplicity in the wavelength-division-multiplexed optical transmission is rapidly increased due to rapid increased demand of an optical transmission capacity. In order to attain the number of wavelength multiplicity, laser diodes of the number of multiplicity are arranged at present (e.g. Hiroshi Toba: O plus E, Vol. 21, No. 8, pp. 965–974). However, if the number of multiplicity is increased in the future, alternative measures are required in consideration of viewpoints of a cost, an apparatus size, the necessity of precise control of a wavelength and the like.

SUMMARY OF THE INVENTION

It is an object in the wavelength-division-multiplexed optical transmission to perform reduction of the number of light sources, a cost and an apparatus size and simple control of a wavelength.

In order to achieve the above object, according to the present invention, an ultrashort pulse solid-state laser having a pulse width of 1 picosecond or less is used as a light source of an optical transmitter. Since the ultrashort pulse solid-state laser has a wide spectrum, a large number of wavelength components required for the wavelength-division-multiplexed optical transmission can be taken out from a single laser. Since a wavelength component for each channel is taken out from the ultrashort pulse solid-state laser through a passive element, control of the wavelength is easy. Consequently, a cost is reduced and an apparatus is made small. In order to use the ultrashort pulse solid-state laser as a multi-wavelength light source for the wavelength-division-multiplexed optical transmission, it is necessary to produce a pulse train at a rate matched to an optical transmission rate. In the optical transmission of the mainstay system, transmission is usually made at a rate of 2.4 GHz or 10 GHz, while a general ultrashort pulse solid-state laser produces a pulse train at a repetition rate of about 100 MHz. The ultrashort pulse laser is also improved and the repetition rate of 1.2 GHz is attained recently (Tomaru et al., Opt. Lett. Vol. 25, No. 8, pp. 584–586), while a higher repetition rate is required. For this need, in the present invention, a resonator including only two elements having a gain medium and a solid-state medium or a chirped mirror having a wavelength-dependent dispersion opposite to that of the gain medium is fabricated to attain a small size and the higher repetition rate. When the solid-state laser is operated at the ultrashort-pulse condition, it is necessary to set a dispersion value in the resonator to a proper value and set a minimum beam diameter of a resonator mode in the gain medium to a proper value. The dispersion value can be set by adjusting a length of the solid-state medium or adjusting a chirped value of the chirped mirror. The minimum beam diameter can be set by adjusting a curvature of the curved surface of the gain medium or the solid-state medium.

These and other objects, features and advantages of the present invention will become more apparent in view of the following detailed description of the preferred embodiments in conjunction with the accompanying drawings.

DESCRIPTION OF THE EMBODIMENTS

Embodiment 1

Figure 1:
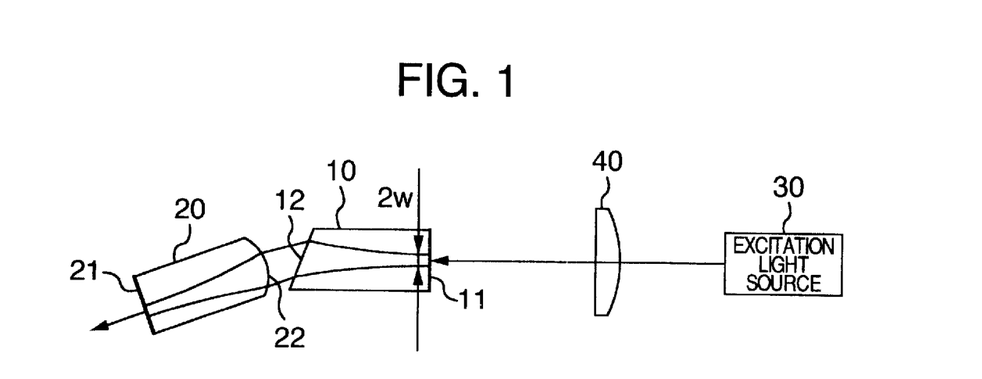
FIG. 1 is a diagram showing an example of a structure of a solid-state laser according to an embodiment 1 of the present invention.

FIG. 1 shows a structure of the embodiment. A resonator includes a gain medium 10 and a solid-state medium 20 having the wavelength-dependent dispersion opposite to that of the gain medium 10. Surfaces 11 and 21 of the gain medium 10 and the solid-state medium 20, which are not opposite to each other, are reflectively coated to the reflectance of about 99.9% in a wavelength of light oscillated, to thereby form end mirrors of the resonator. When a Cr:YAG crystal is used as the gain medium 10, the oscillation light is in the vicinity of 1.5 μm and the representative of the solid-state medium 20 paired therewith is made of fused silica indicating a negative dispersion in a wavelength region thereof. Various glass materials can be applied thereto in addition to the fused silica. A laser using the solid-state medium such as the Cr:YAG crystal as the gain medium 10 is generally named a solid-state laser and particularly a laser using the Cr:YAG crystal as the gain medium is named a Cr:YAG laser. The gain medium for all of Kerr-lens mode-locked solid-state lasers such as Ti:Al$_2$O$_3$, Cr:LiSrAlF$_6$, Cr:Mg$_2$SiO$_4$, Yb:YAG, Yb:Ca$_4$GdO(BO$_3$)$_3$ crystals, Yb:glass, Nd:glass or the like can be employed in addition to the Cr:YAG crystal. The kind of the solid-state medium 20 paired with the gain medium 10 must be selected in consideration of the dispersion in regard to the individual gain medium.

In order to obtain a stable resonator, it is generally required to dispose a lens or a concave mirror in the resonator and narrow down an oscillation light beam. In the embodiment, a surface 22 of the solid-state medium 20, opposite to the gain medium 10 is polished to a curved surface so as to have the function of a lens, so that the stable resonator is obtained. If a diameter of the beam is defined as a diameter at the place where the intensity is $1/e^2$ of this value at the center of the beam, the curvature of the surface 22 is designed so that a beam diameter 2w at the surface 11 of the gain medium is 0.1 mm or less. For a Cr:YAG laser, the beam diameter 2w is typically determined to be about 70 μm. The curved surface 22 is antireflectively coated to the transmittance of about 99.9% in a wavelength of light oscillated. When the gain medium 10 is made of a Cr:YAG crystal having a length of 18 mm and the solid-state medium 20 is made of fused silica, the length of the fused silica is properly about 10 to 20 mm and when a distance between the surfaces 22 and 12 is about 0 to 10 mm, the radius of curvature of the surface 22 is properly about 2 to 4 mm.

Figure 4:
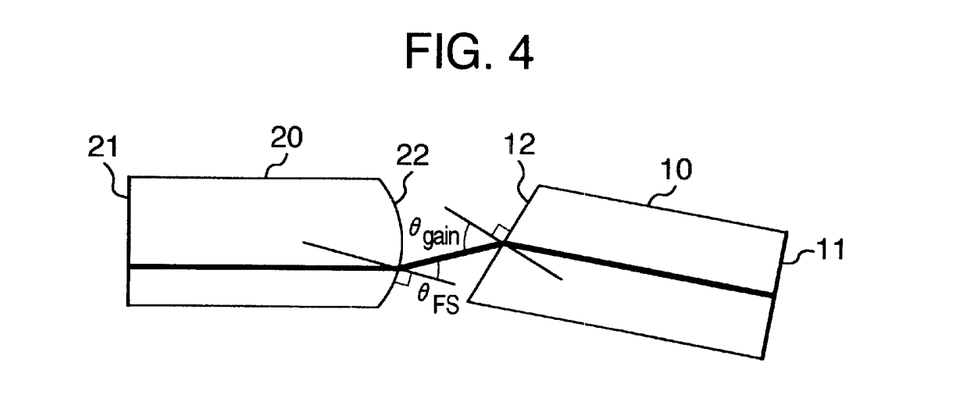
FIG. 4 is a diagram showing an enlarged resonator of FIGS. 1, 2 and 3 to show an optical axis of an oscillation light.

The surface 12 of the gain medium 10, opposite to the solid-state medium 20 is polished to a plane surface and a polishing angle thereof can be selected from three kinds of angles. In the first case, the surface 12 is polished to the Brewster angle (if the refractive index of the gain medium is $n_{gain}$, $\tan \theta_{gain} = n_{gain}$ as shown in FIG. 4) to the oscillation light. In this case, the reflectance is theoretically zero to polarization (p-polarization) in the paper surface of FIG. 1 and a loss in the surface 12 can be almost reduced to zero. In the second case, the surface 12 is polished perpendicularly to the propagating direction of light oscillated ($\theta_{gain} = 0$). In this case, the surface is coated antireflectively to the oscillation light in order to suppress reflection at the surface 12. In the third case, the surface 12 is polished at a shifted angle of several degrees to the perpendicularly polished surface ($\theta_{gain} \neq 0$). In this case, the multiple reflection effect having a possibility of being produced in case of the perpendicular polishing can be suppressed. Further, since the third case is not symmetrical in rotation as in the perpendicular polishing, polarization of the light oscillated can be stabilized. Even in this case, since reflection occurs in the surface 12, the surface is antireflectively coated. In the first and third cases, since the symmetry in rotation collapses due to the refraction at the surface 12, a difference occurs in the stability condition of the resonator in the tangential plane and the sagittal plane. The tangential plane means the paper surface of FIG. 1 and the sagittal plane means the surface vertical thereto. In order to compensate the difference, an astigmatism is favored to be produced by the method that the oscillation light is not incident on the curved surface 22 of the solid-state medium 22 vertically. The shifted angle ($\theta_{FS}$ of FIG. 4) from the vertical direction is larger than 20 degrees ($\theta_{FS} > 20$ degrees) when $\theta_{gain}$ is the Brewster angle, and the angle $\theta_{FS}$ is about 10 degrees when $\theta_{gain}$ is 18 degrees, in the case of the Cr:YAG crystal length of 18 mm and the curvature of the surface 22 of about 3 mm.

Excitation of the laser resonator is attained by leading the excitation light from the excitation light source 30 to the gain medium 10. The excitation light is focused on the surface 11 of the gain medium 10 through a focusing lens 40. The distance between the excitation light source 30 and the surface 11 and the focal length of the focusing lens 40 are important particularly when an ultrashort pulse is oscillated. In this case, a beam diameter of the excitation light at the surface 11 is designed to be smaller than that of the resonator mode. The surface 11 is coated highly reflectively (for example, 99.9%) for the oscillation light whereas it is coated not to reflect the excitation light (it is desirable that the reflectance is zero but light is reflected about 5% actually). The excitation light source can use a laser diode, a solid-state laser, a gas laser or the like. When the gain medium 10 is a Cr:YAG crystal, the wavelength of the excitation light is desirably about 1.05 μm and Nd:YAG, Nd:YVO4, Nd:glass, Nd:YLF lasers or the like is proper as the excitation light source in addition to the laser diode.

There are three kinds of methods of taking out an output light from the resonator. In the first method, the output light is taken out from the surface 21 as shown in FIG. 1. In this case, the surface 21 is reflectively coated so that the output light is transmitted partially. The final transmissivity is different depending on a gain medium used but is smaller than or equal to several %. In the case of the Cr:YAG laser, the transmissivity of about 0.5% is used.

Figure 2:
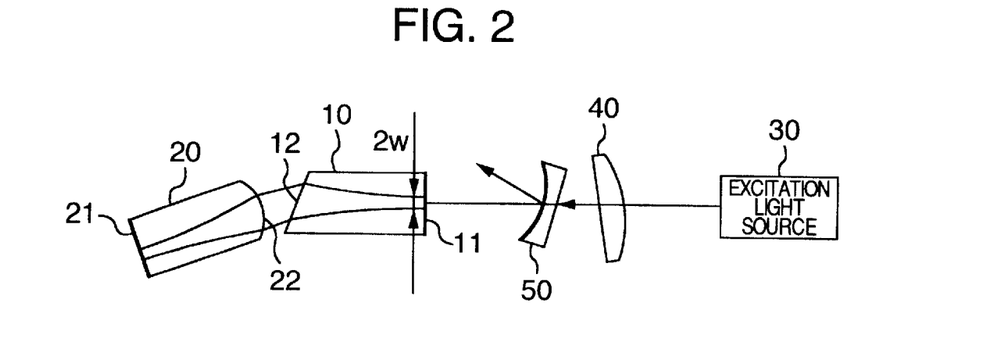
FIG. 2 is a diagram showing an example of a structure of a solid-state laser according to an embodiment 1 of the present invention.

In the second method, the output light is taken out from the surface 11 as shown in FIG. 2. In this case, the surface 11 is reflectively coated so that the oscillation light is transmitted partially. The final transmissivity is different depending on a gain medium used but is smaller than or equal to several %. In the case of the Cr:YAG laser, the transmissivity of about 0.5% is used. The surface 21 is highly reflectively coated. Since the output light taken out from the surface 11 passes through the same optical path as the excitation light, it is necessary to separate the output light from the optical path for the excitation light by means of a dichroic mirror 50. The dichroic mirror 50 transmits the excitation light and reflects the output light. The output light from the surface 11 has a minimum beam diameter at the surface 11 and the beam diameter of the output light produced from the surface 11 spreads gradually. Accordingly, it is advantageous that a concave mirror is used as the dichroic mirror 50 so that the output light is collimated. In this case, the dichroic mirror 50 acts as a concave lens to the excitation light and it is necessary to select the fucusing lens 40 in consideration of the action of the dichroic mirror 50. Since the concave lens 50 is not vertical to the optical axis of the excitation light, an astigmatism occurs. The astigmatism can be compensated by tilting the focusing lens 40 in the same direction as the tilt direction of the concave lens 50 or in the reverse direction thereto as disclosed in Japanese Patent Application No. 12-34306.

Figure 3:
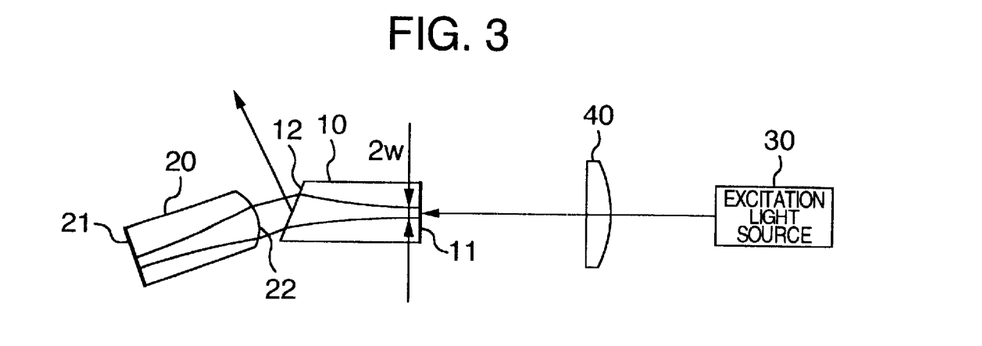
FIG. 3 is a diagram showing an example of a structure of a solid-state laser according to an embodiment 1 of the present invention.

In the third method, as shown in FIG. 3, the surface 12 is polished while it is shifted slightly from the Brewster angle or the surface 12 is polished at an angle shifted from the perpendicular direction to the propagating direction of light so that it is antireflectively coated to have a slite reflective-component. The surface 12 is used as an output coupler. In this case, the surfaces 11 and 21 are highly reflectively coated to the oscillation light.

Embodiment 2

Figure 5:
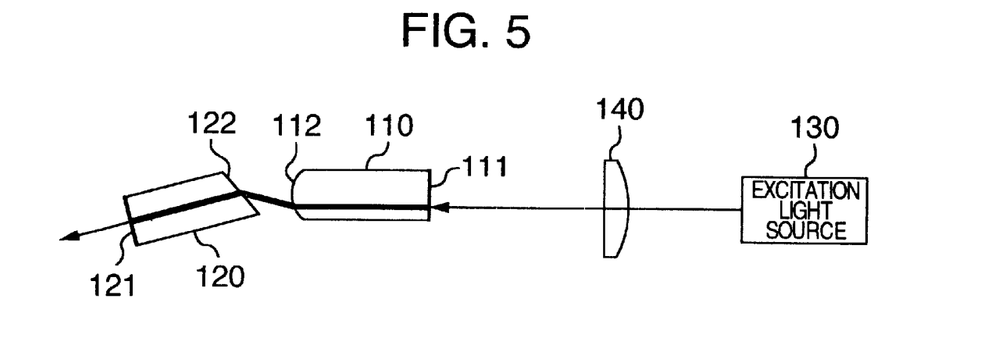
FIG. 5 is a diagram showing an example of a structure of a solid-state laser according to an embodiment 2 of the present invention.
Figure 6:
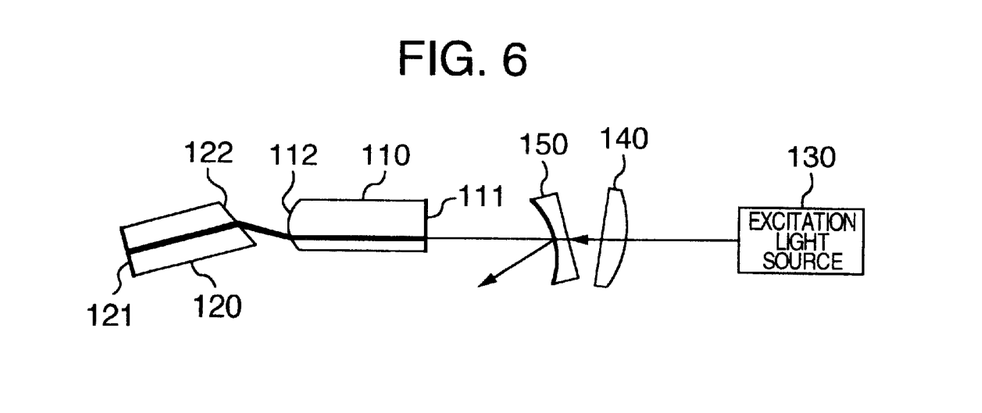
FIG. 6 is a diagram showing an example of a structure of a solid-state laser according to an embodiment 2 of the present invention.
Figure 7:
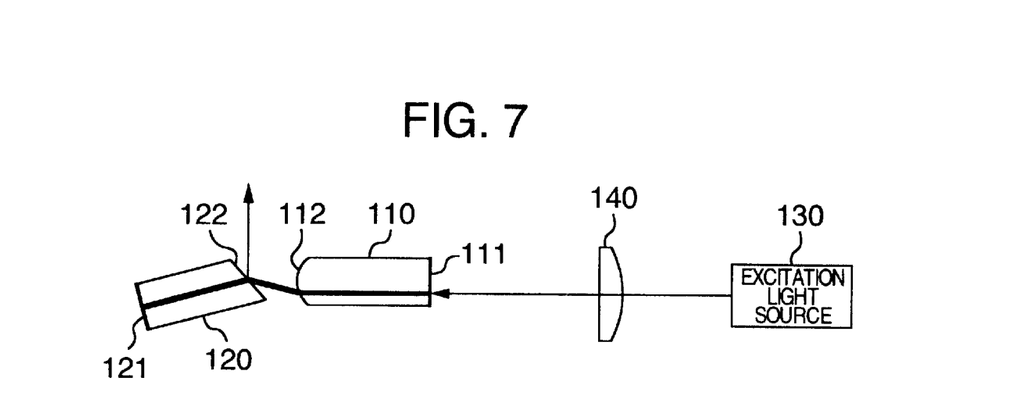
FIG. 7 is a diagram showing an example of a structure of a solid-state laser according to an embodiment 2 of the present invention.

In the embodiment 1, the surfaces of the gain medium 10 are polished to the plane surfaces and one surface 22 of the solid-state medium 20 is polished to the curved surface so as to have the function of lens so that a stability region of the resonator is formed. Conversely, as shown in FIGS. 5, 6 and 7, when surfaces of a solid-state medium 120 are polished to plane surfaces and one surface 112 of a gain medium 110 is polished to a curved surface, the stable resonator can be formed. In the same manner as FIGS. 1, 2 and 3, three drawings are shown depending on how to take out the output light. Similarly to the embodiment 1, a surface 122 of the solid-state medium 120 can be polished at the Brewster angle or perpendicularly to the propagating direction of light or at the shifted angle from the perpendicular direction. The radius of curvature of the curved surface 112 of the gain medium 110 may be about 6 mm for the Cr:YAG laser when a length of the gain medium is 18 mm, a fused silica of 13 mm is used as the solid-state medium 120, and a repetition rate is 2.4 GHz. This radius of curvature is about twice as larger as compared with the embodiment 1. The radius of curvature is determined so that the beam diameter at the surface 111 of the gain medium 110 is optimum. In the embodiment 2, since the lens formed by the curved surface is nearer to the surface 111 as compared with the embodiment 1, a lens having as short a focal length as in the embodiment 1 is not required and the radius of curvature of the surface 111 can be made larger. In this case, there are advantages that the spherical aberration is made small, polishing to a curved surface is made simple and the like Others including the coating method, the method of correcting the astigmatism in the resonator, the specification of dichroic mirror 150, the specification of focusing lens 140 and the like are the same as those in the embodiment 1.

Embodiment 3

Figure 8:
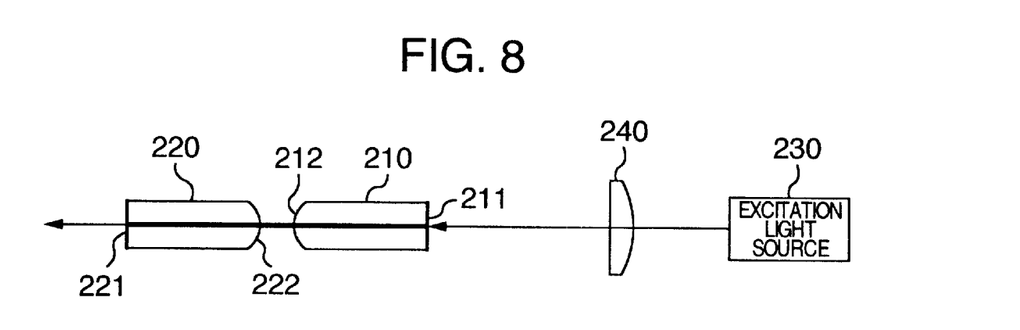
FIG. 8 is a diagram showing an example of a structure of a solid-state laser according to an embodiment 3 of the present invention.
Figure 9:
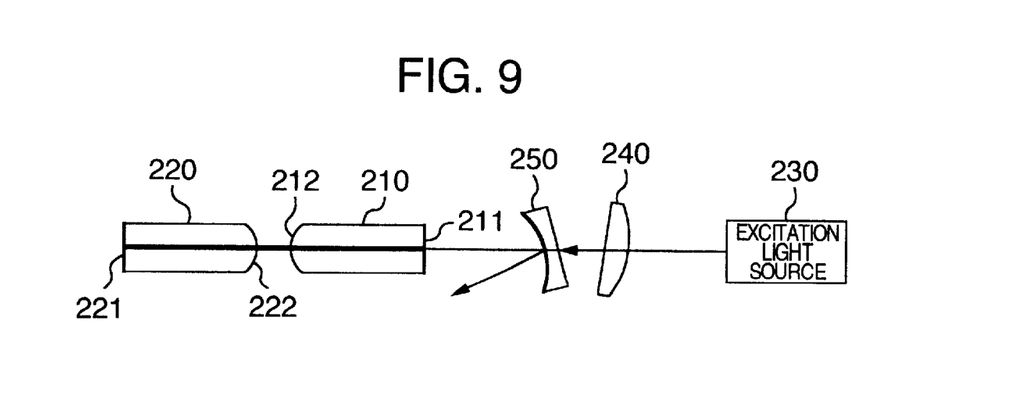
FIG. 9 is a diagram showing an example of a structure of a solid-state laser according to an embodiment 3 of the present invention.

In the embodiments 1 and 2, one of the opposite surfaces of the gain medium and the solid-state medium is polished to the curved surface so as to have the function of lens so that a stability region of the resonator is formed. In this embodiment, as shown in FIGS. 8 and 9, surfaces 212 and 222 of a gain medium 210 and a solid-state medium 220, which are opposite to each other are polished to curved surfaces, so that the stable resonator is formed. By providing the two curved surfaces in the resonator, the spherical aberration can be reduced. There are two kinds of methods of taking out the output light. The method of taking out the output light from a surface 221 of the solid-state medium 220 is shown in FIG. 8 or the method of taking out the output light from a surface 211 of the gain medium 210 is shown in FIG. 9. The coating method of the surfaces is the same as the embodiments 1 and 2. In FIG. 9, the output light is reflected by a dichroic mirror 250 in the same manner as the embodiments 1 and 2. When a concave mirror is used as the dichroic mirror 250, a focusing lens 240 is tilted in order to compensate the astigmatism of the excitation light.

In FIGS. 8 and 9, the inside of the resonator is symmetrical in rotation. There is a case where polarization of the oscillated light is not stabilized in the case of the symmetry in rotation, while by shifting the optical axis of the oscillated light from a center axis of rotation of the resonator, the symmetry in rotation collapses, so that the polarization can be stabilized in the same manner as the embodiments 1 and 2.

Embodiment 4

Figure 10:
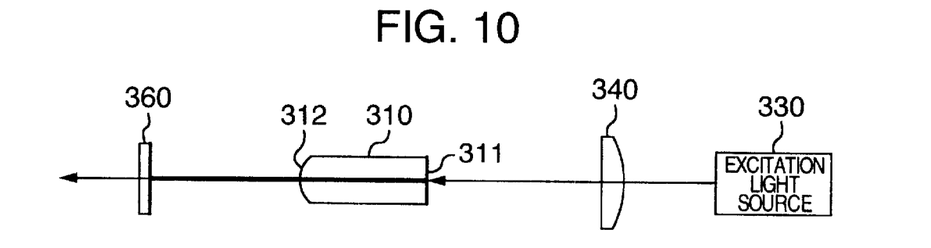
FIG. 10 is a diagram showing an example of a structure of a solid-state laser according to an embodiment 4 of the present invention.
Figure 11:
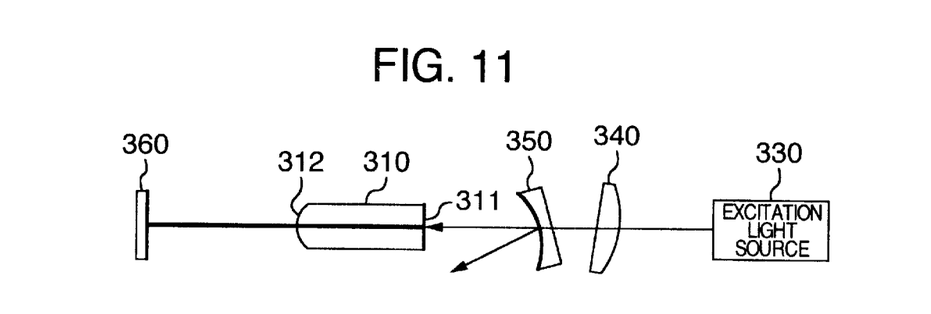
FIG. 11 is a diagram showing an example of a structure of a solid-state laser according to an embodiment 4 of the present invention.

In the embodiments 1, 2 and 3, the gain medium and the solid-state medium having the wavelength-dependent dispersion opposite to that of the gain medium are paired to form the resonator and by adjusting the length of the solid-state medium, a dispersion value in the resonator is set to a predetermined value. In this embodiment, a chirped mirror for producing dispersion upon reflection is used instead of the solid-state medium (FIGS. 10 and 11). An example of the solid-state laser using the chirped mirror is described in JP-A-11-168252 of the Inventors. The chirped mirror is formed of a multi-layer of dielectric or semiconductor and the thickness of the layers is changed gradually. The chirped mirror is accompanied by dispersion (e.g. N. Matuschek, F. X. Kärtner, and U. Keller, IEEE Journal of Quantum Electronics, Vol. 35, No. 2, pp. 129–137 (1999)). The sign and the magnitude of the dispersion can be set to any values by controlling the thickness of the layers and are designed to be matched to the dispersion value of the gain medium. The function of lens is required in the resonator in order to form the stable resonator and this lens function is attained by polishing a surface 312 of a gain medium 310 to a curved surface. There are two kinds of methods of taking out the output light. The output light is taken out from the chirped mirror side as shown in FIG. 10 or the output light is taken out from the gain medium side as shown in FIG. 11. A dichroic mirror 350 is used in the latter case and the method thereof is the same as the embodiments 1, 2 and 3. The inside of the resonator of FIGS. 10 and 11 is symmetrical in rotation and there is a case where polarization is not stabilized, while by shifting the optical axis of the oscillation light from an axis of the symmetry in rotation, the symmetry collapses, so that the polarization can be stabilized.

A Kerr-lens mode-locked solid-state laser can be operated spontaneously, while by providing a saturable absorber layer in the resonator, the mode-locked operation is further stabilized. The saturable absorber layer has the characteristic that the transmissivity is high when the light intensity is high and the transmissivity is low when the light intensity is low. Accordingly, the transmissivity is high in a pulse portion where light is present and the transmissivity is reduced in a portion where there is no light, so that the saturable absorber layer acts to promote the pulse oscillation. The saturable absorber layer can be fabricated from a semiconductor (e.g. U. Keller, K. J. Weingarten, F. X. Kärtner, D. Kopf, B. Braun, I. D. Jung, R, Fluck, C. Hönninger, N. Matuschek, and J. A. der Au, IEEE Journal of Selected Topics in Quantum Electronics, Vol. 2, No. 3, pp. 435–453 (1996)) and by providing the saturable absorber layer on the coating of a chirped mirror 360 in a stacked structure, that is, by providing a multi-layer reflection coating accompanied by the dispersion and the saturable absorber layer in a stacked structure to form the chirped mirror, the solid-state laser capable of producing an ultrashort pulse stably can be fabricated.

Embodiment 5

The ultrafast pulse solid-state laser has a wide spectrum and it can be taken out at every wavelength to be used as a multi-wavelength light source for the wavelength-division-multiplexed optical transmission. This configuration is definitely shown in FIG. 12 in block. The optical transmission usually uses a wavelength of the 1.5 µm band and accordingly a solid-state laser suitable thereto is a Cr:YAG laser. An output of a solid-state laser 510 is led to a WDM splitter 520 composed of a diffraction grating or a waveguide type diffraction grating (e.g. A. Kaneko, T. Goh, H. Yamada, T. Tanaka, and I. Ogawa, IEEE. Journal of Selected Topics in Quantum Electronics, Vol. 5, No. 5, pp. 1227–1236 (1999)) to be separated in each wavelength. The separated wavelength components are led to individual modulators 530, respectively, and modulated by signals. The modulated wavelength components are combined in a WDM combiner 540 composed of a diffraction grating or a waveguide type diffraction grating to be transmitted. An optical transmitter 500 is formed by the above constituent elements.

Figure 12:
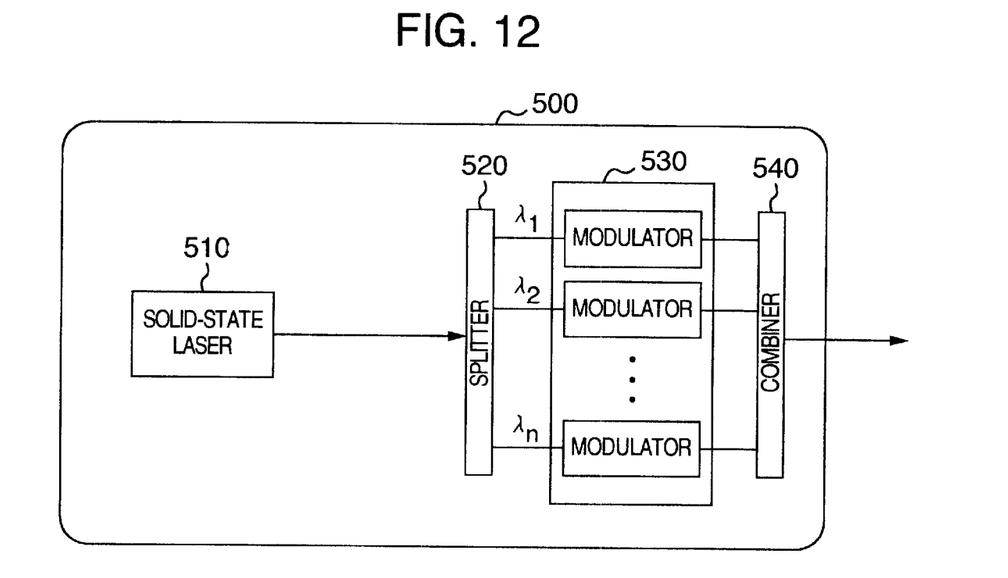
FIG. 12 is a diagram showing an example of a structure of a solid-state laser according to an embodiment 5 of the present invention.
Figure 13:
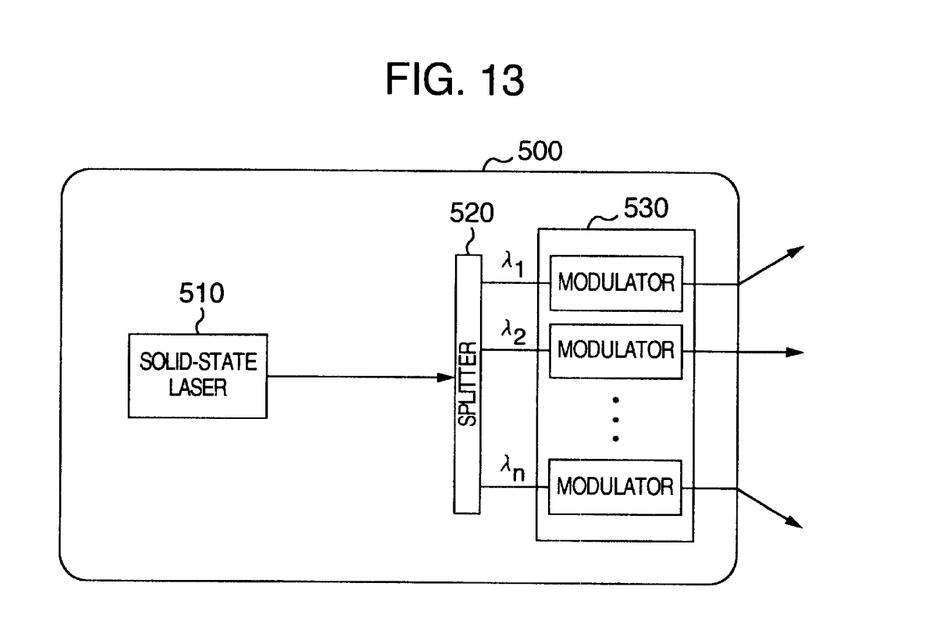
FIG. 13 is a diagram showing an example of a structure of a solid-state laser according to an embodiment 5 of the present invention.

In FIG. 12, the wavelength components are combined into one signal by the WDM combiner 540 to be transmitted to a place, while there is a case where a destination for transmission is different depending on each wavelength for reasons of network management. In this case, the combiner is not provided as shown in FIG. 13 and the modulated wavelength components may be outputted in each wavelength.

Figure 14:
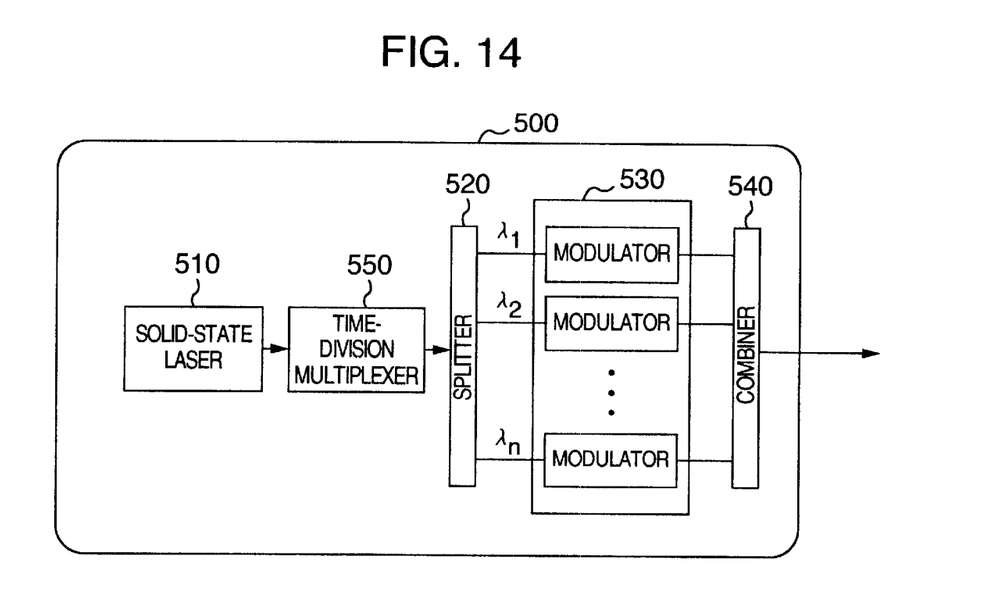
FIG. 14 is a diagram showing an example of a structure of a solid-state laser according to an embodiment 5 of the present invention.
Figure 15:
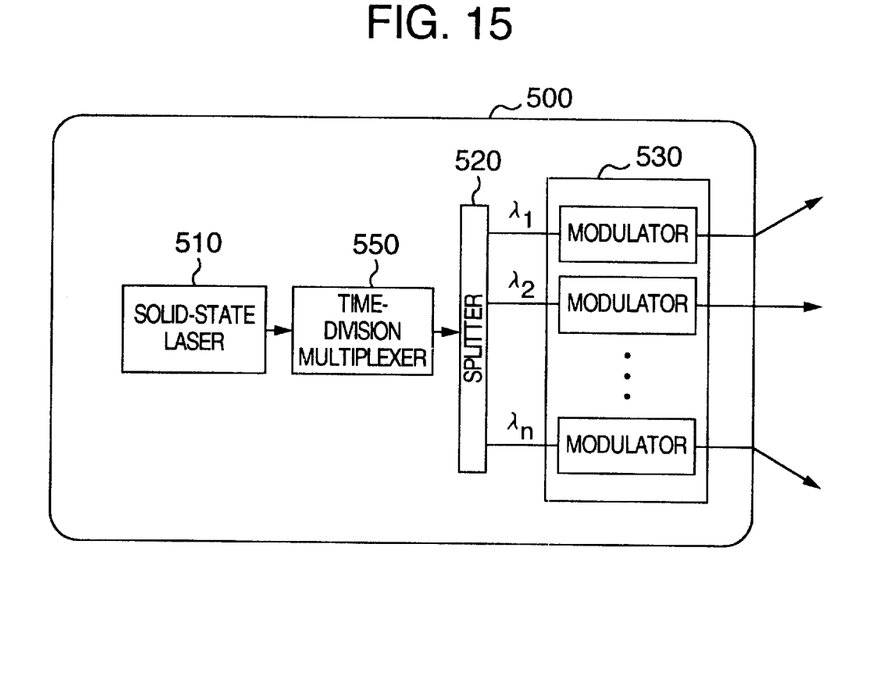
FIG. 15 is a diagram showing an example of a structure of a solid-state laser according to an embodiment 5 of the present invention.

In the optical transmission of the mainstay system, a bit rate of 2.4 GHz or 10 GHz is used usually. When the ultrafast pulse solid-state laser of the embodiments 1 to 4 is used, such a bit rate can be attained, while when another solid-state laser having the resonator length of 10 cm to several meters is used, the bit rate is made small. In this case, as shown in FIGS. 14 and 15, an output of the solid-state laser 510 is led to a time-division multiplexer 550 having the function of multiplying the repetition rate of a pulse by integral times so that the bit rate is increased. The configuration subsequent to the time-division multiplexer 550 is the same as that of FIGS. 12 and 13.

Figure 16:
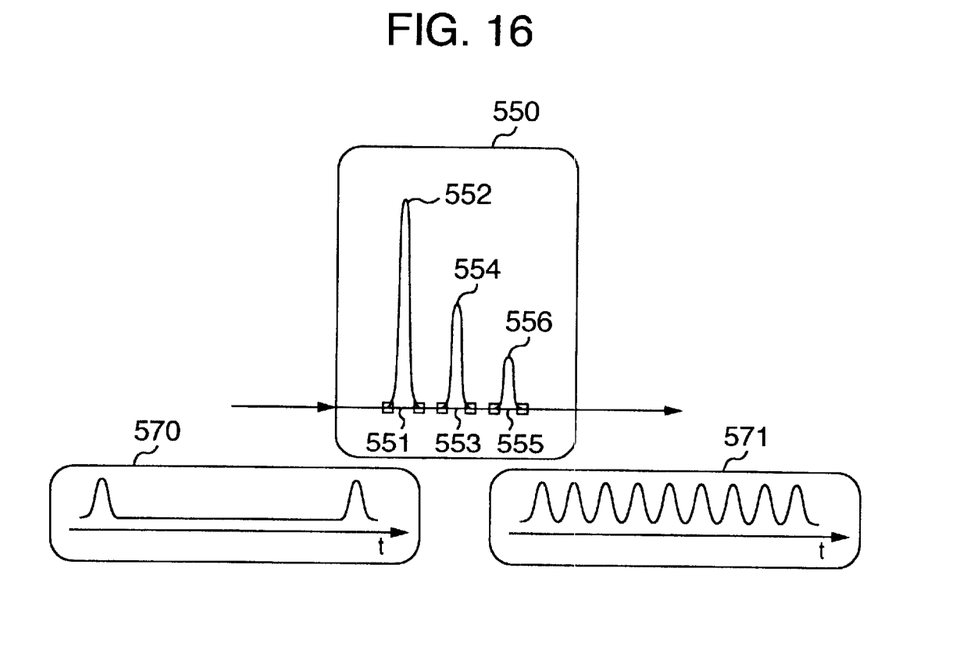
FIG. 16 is a diagram showing an example of a structure of a time-division multiplexer 550 of the embodiment 5 according to the present invention.
Figure 17:
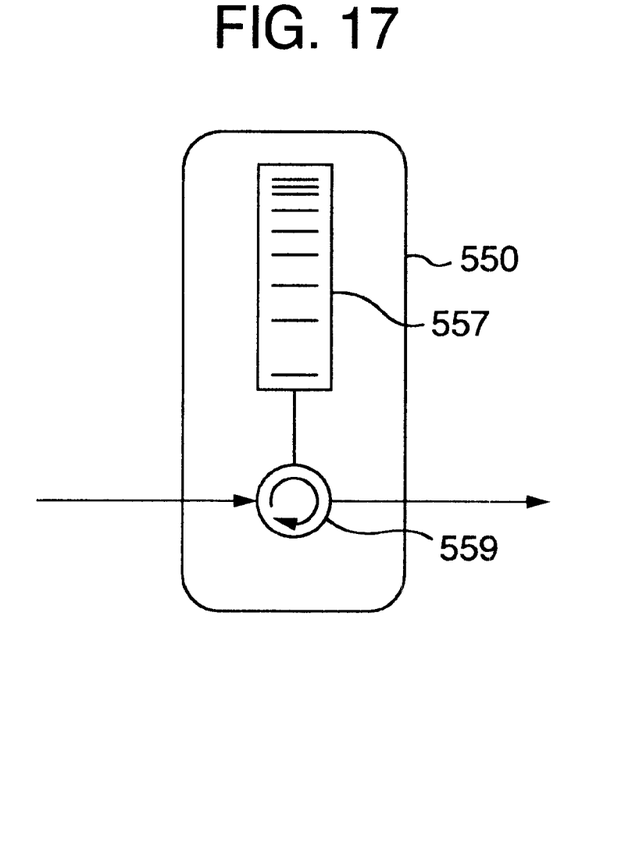
FIG. 17 is a diagram showing an example of a structure of a time-division multiplexer 550 of the embodiment 5 according to the present invention.
Figure 18:
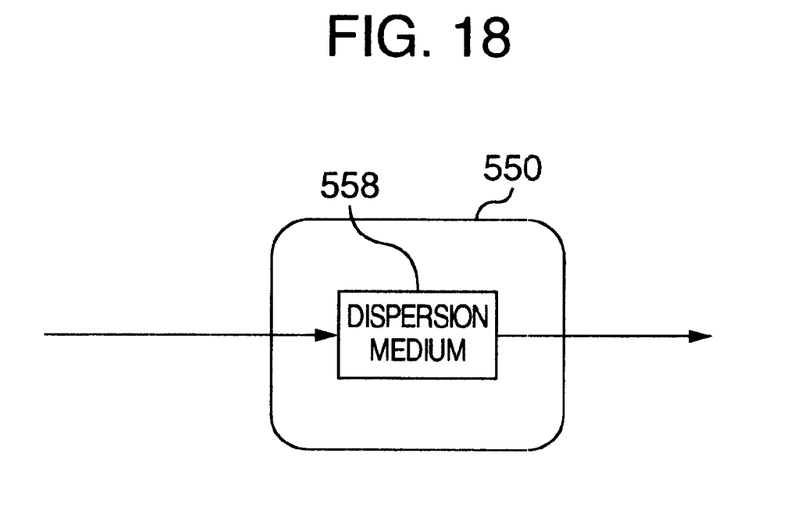
FIG. 18 is a diagram showing an example of a structure of a time-division multiplexer 550 of the embodiment 5 according to the present invention.

The time-division multiplexer 550 can be configured by various methods. The representatives thereof are shown in FIGS. 16 to 18. The time-division multiplexer shown in FIG. 16 uses a delay line. An input light is divided into two optical paths 551 and 552 and then the divided light are combined. Since the optical paths 551 and 552 are different in length, a bit rate of the combined signal is twice. A pair of optical paths 553 and 554 and a pair of optical paths 555 and 556 are also operated similarly, so that the bit rate of a pulse train output from the time-division multiplexer of FIG. 16 is eight times as a whole.

FIG. 17 shows an example of the time-division multiplexer 550 using a linearly-chirped fiber grating 557. An input light to the time-division multiplexer 550 is led to the linearly-chirped fiber grating 557 by means of an optical circulator 559. The input light is reflected while being accompanied by dispersion in the same manner as the chirped mirror in the linearly-chirped fiber grating 557. Then, the reflected light is returned to the optical circulator again and outputted from the time-division multiplexer. An amount of dispersion set in the linearly-chirped fiber grating 557 is increased so that a pulse width is spread as a result of the dispersion and adjacent pulses overlap each other. By setting the amount of dispersion to a proper value, the pulses are converted into a pulse train having the increased bit rate as a result of interference of the pulses. The method of setting the amount of dispersion is described in a paper: J. Azaa and M. A. Muriel, Optics Letters, Vol. 24, No. 23, pp. 1672–1674 (1999).

In FIG. 17, the linearly-chirped fiber grating 557 is used to give dispersion to the pulse train, while the linearly-chirped fiber grating 557 is not necessarily required therefor and any dispersion medium 558 may be used as far as it gives a predetermined dispersion. It is shown in FIG. 18.

The function of lens can be attained by polishing the gain medium or the solid-state medium to a curved surface, so that the ultrashort pulse solid-state laser having the small size and the high repetition rate can be provided. Further, by using the solid-state laser as a light source for a transmitter of the wavelength-division-multiplexed optical transmission, the number of light sources in the transmitter can be reduced greatly.

While the present invention has been described above in conjunction with the preferred embodiments, one of ordinary skill in the art would be enabled by this disclosure to make various modifications to this embodiment and still be within the scope and spirit of the invention as defined in the appended claims.

What is claimed is:

1. A solid-state laser comprising an excitation light source, a lens system for focusing an excitation light produced from said light source, and a laser resonator which is laser-oscillated in response to the focused excitation light, wherein said resonator includes only a gain medium and a solid-state medium having dispersion of a wavelength dependence opposite to that of said gain medium, and surfaces of said gain medium and said solid-state medium, which are respectively at opposite sides of opposing surfaces of said gain medium and said solid-state medium, are reflectively coated and act as mirror surfaces, at least one of the other surfaces of said gain medium and said solid-state medium, which are positioned inside said resonator and are opposite to each other, being polished to a curved surface, and wherein an oscillation light is made to enter said solid-state medium at an angle such that the oscillation light is not incident on the curved surface vertically, and said gain medium being excited by said focused excitation light so that the laser oscillation is made in said resonator.

2. A solid-state laser according to claim 1, wherein said gain medium is made of any of Cr:YAG, Ti:Al$_2$O$_3$, Cr:LiSrAlF$_6$, Cr:Mg$_2$SiO$_4$, Yb:YAG and Yb:Ca$_4$GdO(BO$_3$)$_3$ crystals, Yb:glass, and Nd:glass.

3. A solid-state laser according to claim 1, wherein if a diameter at a place where the intensity is 1/e$^2$ of that on an optical axis of a resonator mode is defined as a diameter of a beam, a minimum diameter of the beam in said gain medium is smaller than or equal to 0.1 mm.

4. A solid-state laser according to claim 1, wherein said excitation light source is any of a laser diode, a gas laser and a solid-state laser.

5. A solid-state laser according claim 1, wherein said solid-state medium having dispersion of the wavelength dependence opposite to that of said gain medium is any of fused silica, glass, MgF$_2$ and CaF$_2$.

6. A solid-state laser according to claim 1, wherein a surface which is not polished to a curved surface, of two surfaces of said gain medium and said solid-state medium, which are positioned inside said resonator and are opposite to each other, is polished to a Brewster angle to the oscillation light.

7. A solid-state laser according to claim 1, wherein a surface which is not polished to a curved surface, of two surfaces of said gain medium and said solid-state medium, which are positioned inside said resonator and are opposite to each other, is polished perpendicularly to a propagating direction of the oscillation light and is coated antireflectively.

8. A solid-state laser according to claim 1, wherein a surface which is not polished to a curved surface, of two surfaces of said gain medium and said solid-state medium, which are positioned inside said resonator and are opposite to each other, is polished so that an incident angle of the oscillation light from the outside of said gain medium or said solid-state medium, to said surface which is not polished to the curved surface is larger than or equal to 0 degree and smaller than 90 degrees and is coated antireflectively.

9. A solid-state laser according to claim 1, wherein an output light of said resonator is any one or both of light transmitted from said mirror surfaces of said gain medium and said solid-state medium, which are not opposite to each other, and light reflected from a surface which is not polished to a curved surface, of two surfaces of said gain medium and said solid-state medium, which are positioned inside said resonator and are opposite to each other.

10. A solid-state laser according to claim 1, wherein an incident angle of the oscillation light from the outside of said gain medium or said solid-state medium, to said surface which is polished to the curved surface, of said gain medium or said solid-state medium is larger than or equal to 0 degree and smaller than 90 degrees.

11. A solid-state laser comprising an excitation light source, a lens system for focusing an excitation light produced from said light source, and a laser resonator which is laser-oscillated in response to the focused excitation light, wherein said resonator includes only a gain medium and a chirped mirror having a dispersion of a wavelength dependence opposite to that of said gain medium, and a surface of said gain medium, which is not opposite to said chirped mirror is coated reflectively, a surface of said gain medium, which is opposite to said chirped mirror, being polished to a curved surface, said gain medium being excited by said focused excitation light so that the laser oscillation is made in said resonator.

12. A solid-state laser according to claim 11, wherein said chirped mirror is formed of a multi-layer of dielectric or semiconductor.

13. A solid-state laser according to claim 11, wherein said chirped mirror includes a stacked structure of a multi-layer reflection coating accompanied by dispersion and a saturable absorber layer.

14. A solid-state laser according to claim 11, wherein said gain medium is made of any of Cr:YAG, Ti:Al$_2$O$_3$, Cr:LiSrAlF$_6$, Cr:Mg$_2$SiO$_4$, Yb:YAG, and Yb:Ca$_4$GdO(BO$_3$)$_3$ crystals, Yb:glass, and Nd:glass.

15. A solid-stage laser according to claim 11, wherein if a diameter at a place where the intensity is 1/e$^2$ of that on an optical axis of a resonator mode is defined as a diameter of a beam, a minimum diameter of the beam in said gain medium is smaller than or equal to 0.1 mm.

16. A solid-state laser according to claim 11, wherein said excitation light source is any of a laser diode, a gas laser and a solid-state laser.

17. A solid-state laser according to claim 11, wherein an output light from said resonator is any one or both of light transmitted from a surface of said gain medium which is not opposite to said chirped mirror and light transmitted from said chirped mirror.

18. A solid-state laser according to claim 11, wherein an incident angle of the oscillation light from the outside of said gain medium, to said surface which is polished to the curved surface, of said gain medium is larger than or equal to 0 degree and smaller than 90 degrees.

* * * * *